(12) United States Patent
Farivar et al.

(10) Patent No.: US 10,803,301 B1
(45) Date of Patent: Oct. 13, 2020

(54) DETECTING FRAUD IN IMAGE RECOGNITION SYSTEMS

(71) Applicant: Capital One Services, LLC, McLean, VA (US)

(72) Inventors: Reza Farivar, Champaign, IL (US); Austin Walters, Savoy, IL (US); Jeremy Goodsitt, Champaign, IL (US); Fardin Abdi Taghi Abad, Champaign, IL (US); Vincent Pham, Champaign, IL (US); Mark Watson, Urbana, IL (US); Kenneth Edward Taylor, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/529,859

(22) Filed: Aug. 2, 2019

(51) Int. Cl.
  *G06K 9/00* (2006.01)
  *G06K 9/62* (2006.01)
  *G06N 3/04* (2006.01)
  *G06N 3/08* (2006.01)

(52) U.S. Cl.
  CPC ..... *G06K 9/00288* (2013.01); *G06K 9/00228* (2013.01); *G06K 9/6256* (2013.01); *G06N 3/0454* (2013.01); *G06N 3/08* (2013.01)

(58) Field of Classification Search
  None
  See application file for complete search history.

(56) References Cited

U.S. PATENT DOCUMENTS

| | | | |
|---|---|---|---|
| 7,643,683 B2* | 1/2010 | Miller | G06K 9/00208 345/419 |
| 7,804,982 B2 | 9/2010 | Howard et al. | |
| 9,026,303 B1* | 5/2015 | Ferguson | G05D 1/00 701/28 |
| 9,230,158 B1* | 1/2016 | Ramaswamy | G06K 9/00281 |
| 2004/0085324 A1* | 5/2004 | Yao | G06T 11/001 345/581 |
| 2005/0083332 A1* | 4/2005 | Hung | G06T 13/40 345/473 |
| 2005/0129310 A1* | 6/2005 | Herley | G06T 7/194 382/168 |
| 2006/0120573 A1* | 6/2006 | Iori | G06K 9/036 382/124 |
| 2007/0165945 A1* | 7/2007 | Goma | H04N 1/6077 382/167 |

(Continued)

*Primary Examiner* — Iman K Kholdebarin
(74) *Attorney, Agent, or Firm* — DLA Piper LLP (US)

(57) ABSTRACT

In one aspect, the present disclosure relates to a method for detecting fraud in image recognition systems, the method including receiving one or more input images from a device associated with a user, the one or more input images comprising a face associated with the user; identifying the face in the one or more input images with a computer vision technique; analyzing the one or more input images using a first neural network trained to recognize the user's face; analyzing the one or more input images using a second neural network trained to detect fraudulent images; determining whether the image is fraudulent or non-fraudulent; granting access to the user if the first neural network recognizes the user's face and the image is determined to be non-fraudulent; and preventing access to the user if the first neural network cannot recognize the user's face or the image is determined to be fraudulent.

20 Claims, 9 Drawing Sheets

(56) References Cited

U.S. PATENT DOCUMENTS

| | | | |
|---|---|---|---|
| 2007/0291120 A1* | 12/2007 | Campbell | G06T 7/155 348/162 |
| 2008/0170810 A1* | 7/2008 | Wu | G06K 9/4671 382/305 |
| 2008/0181505 A1* | 7/2008 | Wu | G06F 16/5846 382/190 |
| 2008/0240489 A1* | 10/2008 | Marugame | G06T 1/00 382/100 |
| 2009/0310828 A1* | 12/2009 | Kakadiaris | G06K 9/4661 382/118 |
| 2012/0219192 A1* | 8/2012 | Noguchi | G06K 9/00261 382/118 |
| 2013/0272606 A1* | 10/2013 | Nakamura | G06T 7/90 382/167 |
| 2014/0056512 A1* | 2/2014 | Lerios | H04N 1/603 382/162 |
| 2015/0302252 A1* | 10/2015 | Herrera | G06K 9/00281 382/117 |
| 2016/0371535 A1* | 12/2016 | Li | G06K 9/00288 |
| 2018/0025243 A1* | 1/2018 | Chandraker | G06K 9/00228 382/118 |
| 2019/0102608 A1* | 4/2019 | Wang | H04N 5/23219 |
| 2019/0266388 A1* | 8/2019 | Kolagunda | G06K 9/00308 |
| 2019/0332757 A1* | 10/2019 | Chen | G06K 9/00288 |
| 2020/0021886 A1* | 1/2020 | Kawk | G06K 9/00302 |

* cited by examiner

DETECTING FRAUD IN IMAGE RECOGNITION SYSTEMS

BACKGROUND

There is a push to enable facial recognition as a more widespread and commonly used security feature. Some smartphones currently employ facial recognition as a means to unlock and gain access to the smartphone, while facial recognition can also be used for access to specific applications within smartphones or websites on a computer, such as a banking application or banking website. This would function similar to fingerprint recognition or iris scanning for gaining access to applications or smartphones.

The problem with facial recognition is that it can be less secure than fingerprint or iris scanning. This is because it is often much easier to duplicate a person's face than a person's fingerprint. It may be possible for fraudsters to pass a facial recognition security check by having a picture of the person's face, either as a 2D picture on paper or a 3D mask. Additionally, for a facial recognition security check on a web interface of a computer that takes a picture using a webcam, fraudsters may be able to bypass the taking of the picture by the webcam and upload an image of the person. In the preceding scenarios, the system may incorrectly recognize the image as the authorized person, which would allow the fraudster to gain access. Fraudulent access to a smartphone or banking application can put users' sensitive personal and financial information at risk and cause serious harm.

SUMMARY

According to an aspect of the present disclosure, a method for detecting fraud in image recognition systems can include: receiving one or more input images from a device associated with a user, the one or more input images comprising a face associated with the user; identifying the face in the one or more input images with a computer vision technique; analyzing the one or more input images using a first neural network trained to recognize the user's face; analyzing the one or more input images using a second neural network trained to detect fraudulent images; determining, based on the second analyzing step, whether the image is fraudulent or non-fraudulent; granting access to the user if the first neural network recognizes the user's face and, as a result of the determining step, the image is non-fraudulent; and preventing access to the user if the first neural network cannot recognize the user's face or, as a result of the determining step, the image is fraudulent.

In some embodiments, the second neural network may be trained to determine if the one or more input images match an image from a set of deformed images, the set of deformed images comprising a set of deformed images generated by applying a set of deformations to the one or more input images. In some embodiments, the set of deformed images may include images generated by applying the set of deformations to images obtained from the user's social media profiles.

In some embodiments, the method for detecting fraud in image recognition systems can include: periodically updating the set of deformed images by obtaining new images from the user's social media profiles; and applying the set of deformations to the new images obtained from the user's social media profiles. In some embodiments, the set of deformed images may include images generated by applying the set of deformations to images stored on the device associated with the user. In some embodiments, the second neural network may be hyper-trained to require a closer match than the first neural network. In some embodiments, the one or more received input images are photos taken by the device associated with the user. In some embodiments, the receiving may include receiving exactly one input image.

According to another aspect of the disclosure, a method for detecting fraud in image recognition systems may include: obtaining, by a device associated with a user, one or more input images associated with the user, the one or more input images comprising a face associated with the user; using a model comprising two neural networks to analyze the one or more input images as an authentication check to verify the identity of the user; granting access to the user if the model recognizes the user's face and, as a result of the determining step, the image is non-fraudulent; and preventing access to the user if the model cannot recognize the user's face or, as a result of the determining step, the image is fraudulent. The model may be configured to: identify a face of the user in the one or more input images with a computer vision technique; analyze the one or more input images using a first neural network trained to recognize the user's face; analyze the one or more input images using a second neural network trained to detect fraudulent images; and determine, based on the second analyzing step, whether the image is fraudulent or non-fraudulent.

In some embodiments, the second neural network may be trained to determine if the one or more input images match an image from a set of deformed images, the set of deformed images comprising a set of deformed images generated by applying a set of deformations to the one or more input images. In some embodiments, the set of deformed images may include images generated by applying the set of deformations to images obtained from the user's social media profiles. In some embodiments, the method for detecting fraud in image recognition systems may include periodically updating the set of deformed images by obtaining new images from the user's social media profiles and applying the set of deformations to the new images obtained from the user's social media profiles. In some embodiments, the device may be a mobile device. In some embodiments, the device may be a computer.

In some embodiments, the second neural network may be hyper-trained to require a closer match than the first neural network to prevent false access prevention. In some embodiments, the set of deformed images may include images generated by applying the set of deformations to images stored on the device associated with the user. In some embodiments, obtaining the one or more input images may include taking, by the device associated with a user, photos. In some embodiments, wherein the obtaining may include obtaining exactly one input image. In some embodiments, the model may be downloaded from a server.

According to another aspect of the present disclosure, a computer-readable medium may include instructions stored thereon. When executed by a machine, the instructions may cause the machine to execute a process operable to: receive one or more input images from a device associated with a user, the one or more input images comprising a face associated with the user. The device may be configured to: obtain one or more input images associated with a user comprising a face associated with the user; and send one or more input images to a server. The server may configured to: identify the face in the one or more input images with a computer vision technique; analyze the one or more input images using a first neural network trained to recognize the user's face; analyze the one or more input images using a second neural network trained to detect fraudulent images; determine, based on the second analyzing step, whether the image is fraudulent or non-fraudulent; grant access to the user if the first neural network recognizes the user's face and, as a result of the determining step, the image is non-fraudulent; and prevent access to the user if the first neural network cannot recognize the user's face or, as a result of the determining step, the image is fraudulent.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Embodiments of the present disclosure relate to systems and methods for detecting fraud in image recognition systems using neural networks. In some embodiments, the image recognition security system may be implemented as an authentication check to gain access to a device, application, or web page. When a user attempts to gain access, the security system may prompt the user the submit an image of their face. In some embodiments, the image may be a photo taken by the device, such as a webcam or smartphone camera. After receiving an image, the security system may analyze the image with at least two neural networks. One neural network may be trained to perform standard facial recognition to verify the user's identity. A second neural network may analyze the image to determine if it is a fraudulent image of the user. In some embodiments, the user may be granted access if the image is authenticated by both neural networks. The systems and methods disclosed herein can reduce fraudulent access via image recognition systems and detect fraudulent images that may have previously been difficult to detect.

Figure 1:
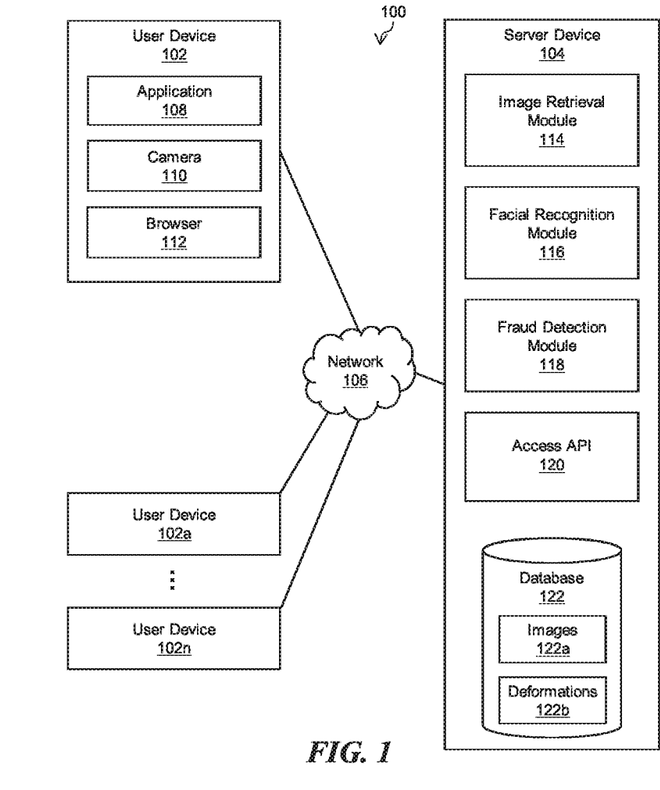
FIG. 1 is a block diagram of an illustrative security system for detecting fraud in image recognition systems, according to some embodiments of the present disclosure.

FIG. 1 shows an illustrative security system 100 for detecting fraud in image recognition systems, according to some embodiments of the present disclosure. Security system 100 can include one or more user devices 102a, 102b, ..., 102n (102 generally) communicably coupled to server device 104 via a network 106.

Server device 104 may include any combination of one or more of web servers, mainframe computers, general-purpose computers, personal computers, or other types of computing devices. Server device 104 may represent distributed servers that are remotely located and communicate over a communications network, or over a dedicated network such as a local area network (LAN). Server device 104 may also include one or more back-end servers for carrying out one or more aspects of the present disclosure. In some embodiments, server device 104 may be the same as or similar to device 800 described below in the context of FIG. 8.

As shown in FIG. 1, server device 104 can include image retrieval module 114, facial recognition module 116, fraud detection module 118, access API module 120 (or simply "access API"), and a database 122. Image retrieval module 114 may be configured to obtain and process images from user device 102 via network 106. In some embodiments, these images may be taken by camera 110 in user device 102. In some embodiments, image retrieval module 114 may be configured to obtain images from a user's social media profile. In some embodiments, image retrieval module 114 may obtain images stored on the user's device. In some embodiments, image retrieval module 114 may search the Internet for images of the user and download images of the user. In some embodiments, image retrieval module 114 may also send obtained images to database 122 to be stored. In some embodiments, image retrieval module 114 may periodically obtain new images from the user's social media profile, an Internet search tool, or the user's device and send them to database 122. Image retrieval module 114 may send images to facial recognition module 116 to undergo analysis for standard facial recognition; image retrieval module 114 may also send images to fraud detection module 118 to undergo analysis for detection of fraudulent images.

In some embodiments, facial recognition module 116 may be configured to receive images from image retrieval module 114 and use standard facial recognition techniques to verify that the person in the image obtained from device 102 is an authorized person for the account, application, web page, or device that security system 100 is protecting. In some embodiments, facial recognition module 116 may verify the identity of the person in the image by comparing it to known images of the authorized person stored in database 122. In some embodiments, facial recognition module 116 may employ a neural network trained to recognize a person's identity from photos. Once facial recognition module 116 has analyzed the image, the determination of the identity of the person in the image can be sent to Access API 120. In some embodiments, facial recognition module 116 may send the image to fraud detection module 118 for further analysis. Fraud detection module 118 may be configured to receive images from image retrieval module 114 and analyze the received images to detect if they are fraudulent. In some embodiments, fraud detection module 118 may compare images received from image retrieval module 114 with images stored in database 122. In some embodiments, fraud detection module 118 may employ a neural network, which may be different from any neural network employed by facial recognition module 116. Once fraud detection module 118 has analyzed the image, the determination of whether the image is fraudulent may be sent to access API 120.

In some embodiments, access API 120 may use the determinations received from facial recognition module 116 and fraud detection module 118 to either grant or prevent the user from accessing the account, application, web page, or device protected by security system 100. In the embodiment shown, database 122 can store images 122a and a set of deformations 122b. Images 122a can include known images of the person authorized to access the account, application, web page, or device protected by security system 100. In some embodiments, images 122a can include images obtained from the authorizer person's social media profile. Deformations 122b may be applied to images 122a to create a set of deformed images for use by fraud detection module 118.

A user device 102 can include one or more computing devices capable of receiving user input as well as transmitting and/or receiving data via network 106 or communicating with server device 104. In some embodiments, user device 102 can include a conventional computer system, such as a desktop or laptop computer. Alternatively, user device 102 may include a device having computer functionality, such as a personal digital assistant (PDA), a mobile telephone, a smartphone, or other suitable device. In some embodiments, user device 102 may be the same as or similar to user device 900 described below in the context of FIG. 9.

As shown in FIG. 1, a user device 102 can include an application 108 for which a user is attempting to gain access to through security system 100. In some embodiments, security system 100 may be used to grant or prevent access of a user to user device 102 itself. In some embodiments, user device 102 may include a web browser (or "browser") 112 that may display web pages. Browser 112 may be any of a variety of conventional web browsers, including, but not limited to, Google Chrome™, Firefox, Internet Explorer, Microsoft Edge, or Safari®. Browser 108 may also be a custom browser developed by, for example, a financial institution (e.g., Capital One) and provided to customers of the financial institution. In some embodiments, security system 100 may be used to grant or prevent access of a user to a web page displayed within browser 112. User device 102 may also be configured to take photos with camera 100 and send the photos to server device 104 for analysis via network 106.

Network 106 may include one or more wide area networks (WANs), metropolitan area networks (MANs), local area networks (LANs), personal area networks (PANs), or any combination of these networks. Network 106 may include a combination of one or more types of networks such as Internet, intranet, Ethernet, twisted-pair, coaxial cable, fiber optic, cellular, satellite, IEEE 801.11, terrestrial, and/or other types of wired or wireless networks. Network 106 can also use standard communication technologies and/or protocols.

The various system components—such as modules 114, 116, 118, and 120—may be implemented using hardware and/or software configured to perform and execute the processes, steps, or other functionality described in conjunction therewith.

Figure 2:
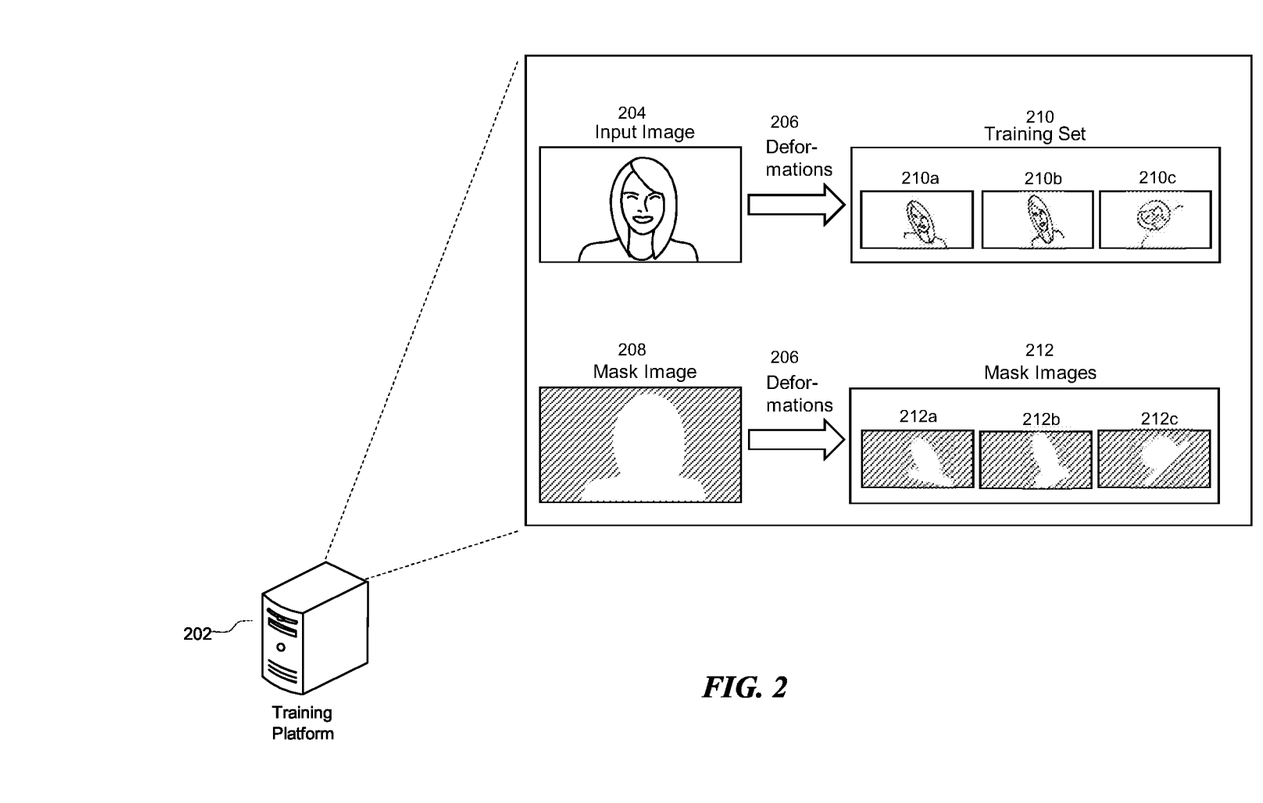
FIG. 2 shows an illustrative training platform for a model to detect fraudulent images that may be used within the system of FIG. 1, according to some embodiments of the present disclosure.

FIG. 2 shows an illustrative training platform 202 for a model to detect fraudulent images that may be used within the system of FIG. 1, according to some embodiments of the present disclosure. In some embodiments, the model may be trained to perform image segmentation according to "Generating Synthetic Images as Training Dataset for a Machine Learning Network", application Ser. No. 15/963,742, filed on Apr. 26, 2018, which is hereby incorporated by reference in its entirety. In some embodiments, the model may be a deep learning neural network. Referring to FIG. 2, input image 204 is an illustrative input image, an image of a face. In image 204, the face may be a target object. Mask image 208 may be associated with input image 204, defining the location of the target object. Mask image 208 may use a first bit value or color to identify the location of the target object, and may use a second bit value or color to identify regions of the input image that are not the target object. Training platform 202 may include large numbers of input images to increase the accuracy of the model. In some embodiments, input images may include images obtained from a user's social media profile. In some implementations, the input image and mask image may be used to train a deep learning neural network to perform segmentation of images. For example, the training platform 202 may teach the neural network to, given a new input image, assign values of "target object" and, perhaps, "not target object", or "face" and "not face".

In some embodiments, training platform 202 may apply a set of deformations 206 to all input images and their associated mask images. The set of deformations 206 may include spatial deformations, lighting deformations, and background deformations, which are each described in turn below. In some implementations, the deformation may be of another type, some of which are provided below as examples. In some implementations, multiple deformations may be applied to the same image.

In some implementations, a deformation may include, for example, a spatial deformation (e.g., rotation, compression, stretching, horizontal deformation, vertical deformation, curving, shearing, magnification, shrinking, or any other spatial modification of the input image).

In some implementations, a deformation may include a background deformation. For example, locations of the image that do not include the target object may be considered a background of the image. Some deformations may replace the background of the image with different content, such as other objects, a pattern, a particular color, a modification to the original background of the image, and/or the like. By deforming the background of the image, detection of the particular object in different backgrounds may be improved.

In some implementations, a deformation may include a lighting deformation. This may include, for example, changing a brightness of a light source, changing a position of a light source, and/or the like. By deforming lighting of the input image, robustness of the training set is improved with regard to different lighting conditions.

In some implementations, a deformation may include, for example, an atmospheric deformation (e.g., making an atmosphere of an image more hazy or less hazy), a color deformation, a deformation of letters or numbers of an image (e.g., changing letters or numbers in the image), adding or removing target objects in an image, moving a target object in the image, adding an object other than the target object in the image, and/or the like.

In some implementations, training platform 202 may render the training set using the deformations. For example, the training platform may render a plurality of deformed images, using the deformations, to generate deformed images. In some implementations, training platform 202 may use a rendering software to render the plurality of images (e.g., Autodesk, V-Ray, Blender, etc.).

As shown in FIG. 2, in a first deformed input image 210a, input image 204 is rotated about an axis. In a first deformed mask image 212a, the same deformation is applied to mask image 208. In a second deformed input image 210b, input image 204 is compressed in a rightward direction. In a second deformed mask image 212b, the same deformation is applied to mask image 208. In a third deformed input image 210c, a lighting of the input image 204 is changed. No deformation may applied to mask image 208 in 212c, meaning the relevant portion of the mask image was unchanged.

The implementations described herein are primarily described in the context of a deep learning neural network. However, the implementations described herein are not limited to those involving a neural network, and may be applied with regard to any model trained by any machine learning algorithm.

Figure 3:
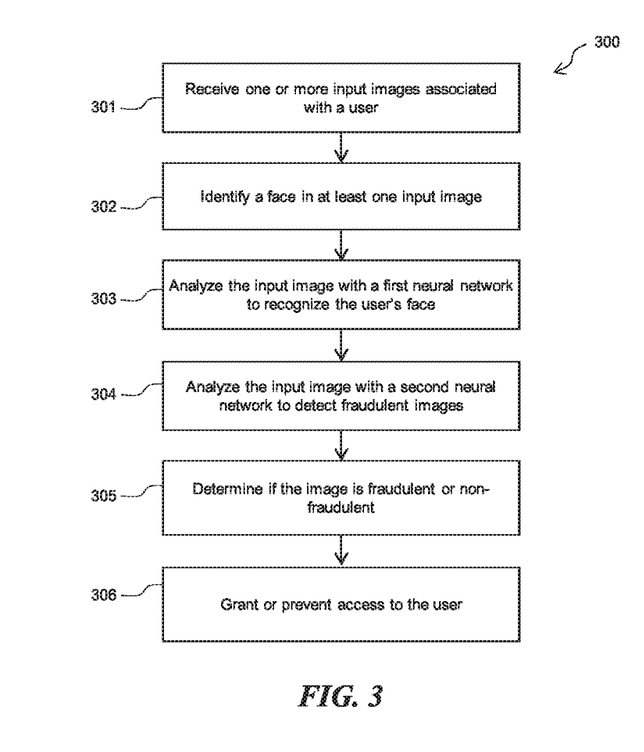
FIGS. 3 and 4 are flow diagrams showing processing that may occur within the system of FIG. 1, according to some embodiments of the present disclosure.

FIG. 3 is a flow diagram showing a process 300 that may occur within system 100 of FIG. 1, according to some embodiments of the present disclosure. At block 301, one or more input images associated with a user as an attempt to access the account, application, web page, or device protected by security system 100 are received. In some embodiments, the user may be attempting to access a web page displayed on a browser 112 on user device 102. In some embodiments, the user may be attempting to access an application 108. In other embodiments, the user may be attempting to access user device 102 itself. In some embodiments, server device 104 may receive input images from user device 102 via network 106. In some embodiments, the input image may be a photo taken by camera 110 of user device 102. In other embodiments, the input image may be a photo taken by a webcam on a computer. In yet other embodiments, the input image may be an image uploaded to server device 104. At block 302, a face is identified in the at least one input image. In some embodiments, this may be performed by facial recognition module 116.

At block 303, the one or more input images are analyzed with a first neural network to perform standard facial recognition, recognize the user's face, and verify the user is an authorized person for the account, application, web page, or device that security system 100 is protecting. In some embodiments, the first neural network may compare the one or more input images with known images of the authorized person. In some embodiments, the known images of the authorized person may be stored in database 122. In some embodiments, standard computer vision techniques that can perform basic facial recognition may be used. In some embodiments, this may be performed by facial recognition module 116. Once the analysis of the input image has been performed, in the context of security system 100, the determination (e.g., positive or negative verification result) may be sent to Access API (120) for further processing.

At block 304, the one or more input images are analyzed with a second neural network to detect if it is fraudulent. In some embodiments, the second neural network may be trained by the training platform 202 of FIG. 2. As previously described, the second neural network may be trained to perform image segmentation. In the context of the present disclosure, the second neural network may compare the one or more input images of the user with a set of deformed images that are known to be of the user. The set of deformed images may be formed by applying a set of deformations to a database of known images of the user. In some embodiments, the known images of the user that are deformed may be the same set of images that the first neural network compares an input image of a user to in order to authenticate the user's identity. In some embodiments, the set of deformations may be the set of deformations 206 of FIG. 2. In some embodiments, the known images of the user may include images obtained from the user's social media profiles. In some embodiments, the known images may include images obtained from googling the user and downloading image results. In some embodiments, the known images may include images stored on the user's device. In some embodiments, these known images may be stored in database 122. As the neural network may be trained to perform image segmentation, the neural network may segment the face of the person in the one or more input images. This may include assigning a certain bit value to the "face" and assigning a different bit value to the "not face". The neural network may then compare the segmented object (e.g., the face) with the set of deformed images to determine if there is a match. In some embodiments, this analysis may be performed by fraud detection module 118. By deforming a large set of known images of a user and detecting whether a signup input image matches an image from that set, the system may be able to mimic what a hacker may do when replicating an image to bypass a facial recognition security check. In some embodiments, the second neural network may be tuned to be more accurate than the first network. In some embodiments, the second neural network may be hyper-trained to detect only the closest matches, limiting false access revocation or false fraud detections. At block 305, the analyzed input image is determined to be fraudulent or non-fraudulent. In some embodiments, if the input image matches an image from the set of deformed images beyond a pre-determined threshold, it may be determined to be fraudulent. If the input image does not match any images from the set of deformed images, it may be determined to be non-fraudulent. In some embodiments, this determination may be sent to Access API 120.

At block 306, based on the determinations from each of the neural networks previously described, the user is either granted access to or prevented from accessing the account, application, web page, or device protected by security system 100. In some embodiments, this may be performed by Access API 120. The processing and decision flowchart governing the determination of whether to allow access or not is discussed in more detail in relation to FIG. 6.

Figure 4:
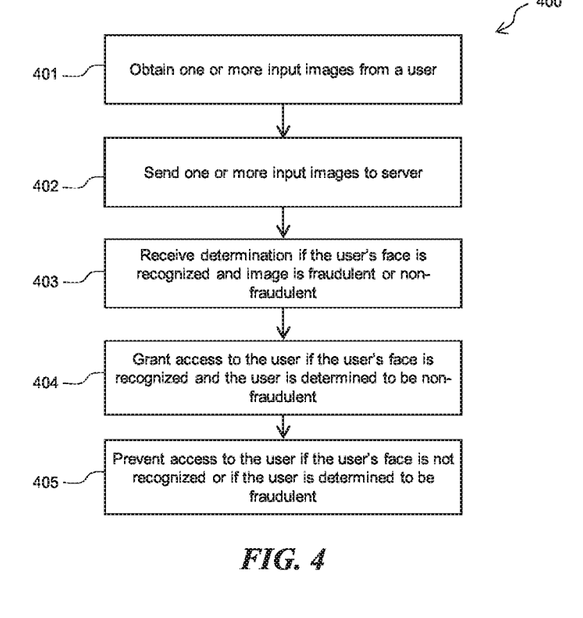

FIG. 4 is a flow diagram showing a process 400 that may occur within system 100 of FIG. 1, according to some embodiments of the present disclosure. At block 401, one or more input images may be obtained from a user as an attempt to access an account, application, web page, or device protected. In some embodiments, this may be protected by security system 100. In some embodiments, user device 102 may obtain images from the user. In some embodiments, user device 102 may be a smartphone and may take a photo using camera 110. In other embodiments, the one or more images may be taken by a webcam. At block 402, the one or more input images may be sent to a server for analysis and processing. In some embodiments, the sending may be performed by user device 102 via network 106 to server device 104.

At block 403, a determination is received on whether the one or more input images are images of a person authorized for access and if the one or more images are fraudulent. In some embodiments, user device 102 may receive these determinations from server device 104. In some embodiments, these determinations are determined by facial recognition module 116 and fraud detection module 118, respectively. At blocks 404 and 405, a decision on whether to allow the user access to the account, application, web page, or device based on the received determinations is determined. In some embodiments, this may be performed by user device 102. The processing and decision flowchart governing the determination of whether to allow access or not is discussed in more detail in relation to FIG. 6.

Figure 5:
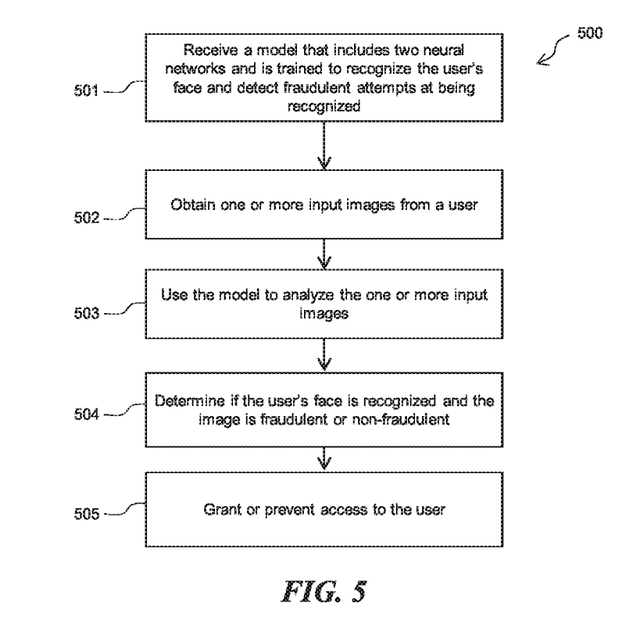
FIG. 5 is a flow diagram showing processing that may occur within an additional embodiment of the security system of FIG. 1, according to some embodiments of the present disclosure.

FIG. 5 is a is a flow diagram showing processing that may occur within an additional embodiment of the security system of FIG. 1, according to some embodiments of the present disclosure. At block 501, a model that may include at least two neural networks is received. The neural networks may be trained to perform standard facial recognition and detect fraudulent images. In some embodiments, the received neural networks may perform similar analysis to facial recognition module 116 and fraud detection module 118 of security system 100. In some embodiments, user device 102 may receive the module that includes two neural networks. At block 502, one or more images may be obtained from a user as an attempt to access an account, application, web page, or device. In some embodiments, this may be protected by security system 100. In some embodiments, this may be a device similar to user device 102. At block 503, the received model is used to analyze the one or more obtained input images. The one or more input images may each be analyzed by each neural network. At block 504, each neural network may return a determination on whether the one or more input images are of an authorized user and whether the input images are fraudulent or non-fraudulent. At block 505, a decision is made whether to grant access to or prevent access from the account, application, web page, or device. The processing and decision flowchart governing the determination of whether to allow access is discussed in more detail in relation to FIG. 6.

Figure 6:
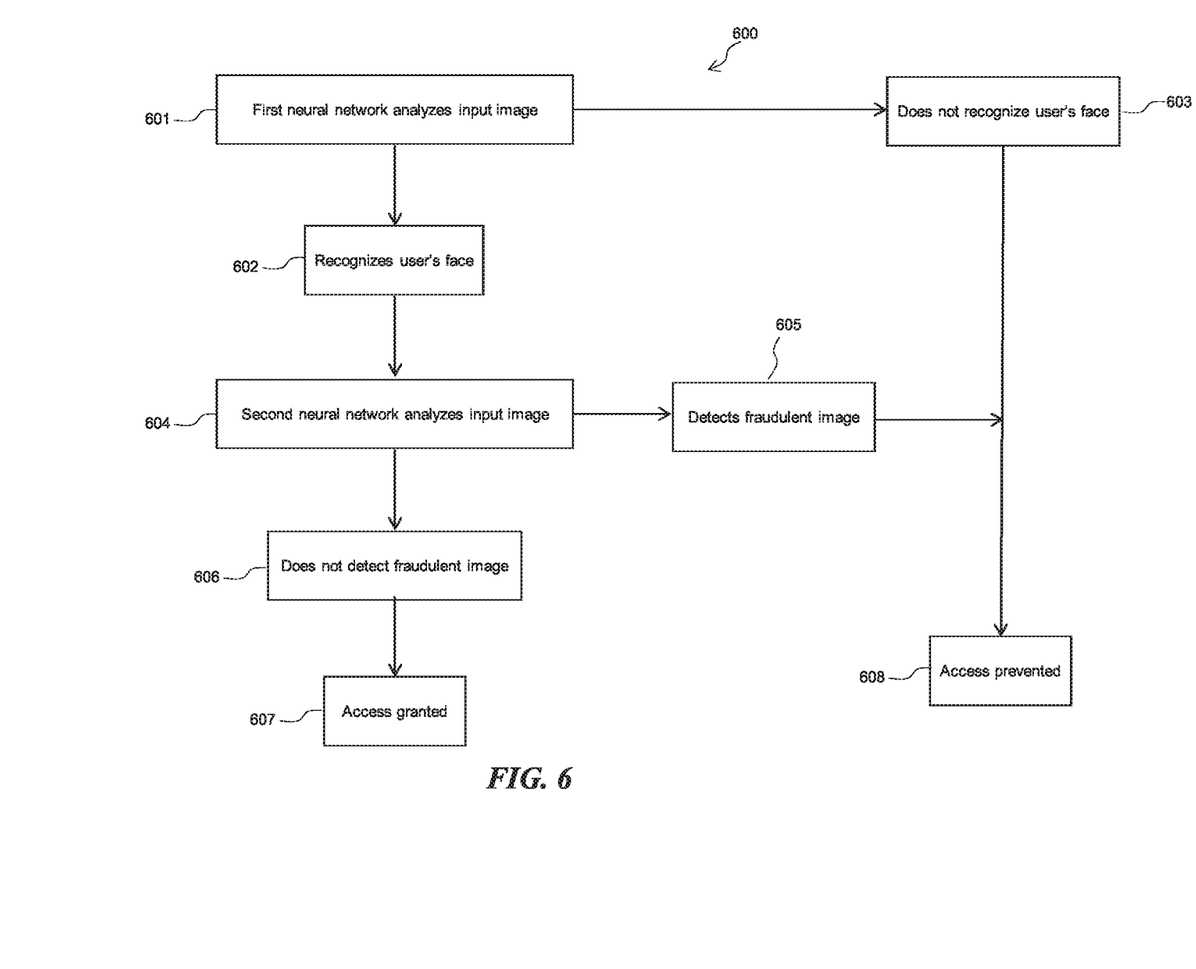
FIG. 6 is an illustrative decision tree that may occur within the system of FIG. 1, according to some embodiments of the present disclosure.

FIG. 6 is an illustrative decision tree that may occur within the system of FIG. 1, according to some embodiments of the present disclosure. Note the order of analysis by the neural networks is not limited to what is shown in FIG. 6 and either neural network may analyze an input image first. In some embodiments, decision process 600 may occur within Access API 120. In some embodiments, in the context of the processing shown in FIG. 5, decision process 600 may occur on a user device. At block 601, a first neural network analyzes an input image obtained from a user. This neural network may be trained to perform standard facial recognition using any conventional computer vision techniques. The first neural network may verify that the identity of the user in the input image matches the identity of an authorized user for an account, application, web page, or device. The first neural network may compare the input image with a database of known images of the authorized user to verify the authorized person is attempting to gain access. If the first neural network determines that the user in the input image is not the same person as the authorized person (block 603) or, in other words, the first neural network does not recognize the user's face, the process may move to block 608 and prevent the user from gaining access. If the user's face is recognized and the identity of the person in the input image is verified as that of the authorized user (block 602), the process moves to block 604.

At block 604, a second neural network analyzes the input image obtained from a user. This neural network may be trained to detect fraudulent images. More specifically, this neural network may be trained to compare the input image with a set of deformed images that are known to be of the user. The set of deformed images may be formed by applying a set of deformations to a database of known images of the user. The type of deformations may be any of, or all of, the deformations described in conjunction with FIG. 2. In some embodiments, the known images of the user may include images obtained from the user's social media profiles. In some embodiments, the known images may include images obtained using the Internet to search for images of the user and downloading the image results. The neural network may be trained to perform image segmentation and may segment the face of the person in the input image. This may include assigning a certain bit value to the "face" and assigning a different bit value to the "not face". The neural network may then compare the segmented object (e.g., the face) with the set of deformed images to determine if there is a match. If a match is found (block 605), the image is determined to be fraudulent, and the process may move to block 608 and prevent the user from gaining access. If a match is not found (block 606), the image is determined to be non-fraudulent and the process moves to block 607, granting access to the user.

Figure 7:
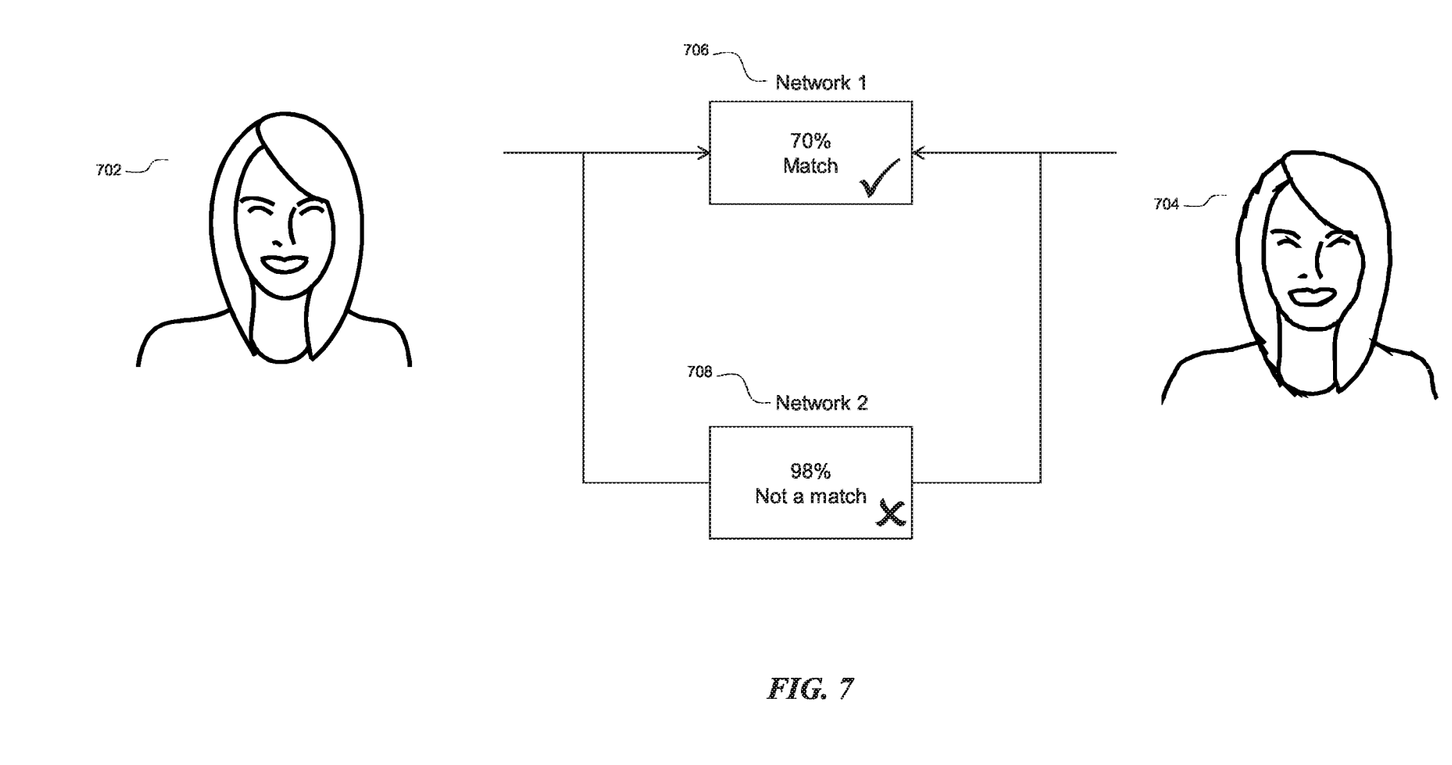
FIG. 7 is an illustrative visualization of the decision tree of FIG. 6, according to some embodiments of the present disclosure.

FIG. 7 is an illustrative visualization of the decision tree of FIG. 6, according to some embodiments of the present disclosure. In some embodiments, such as the embodiment in FIG. 7, both neural networks may be trained to compare an input image (e.g. image 702) to the same set of images, in this case the same set of deformed images, of which image 704 is a part of. However, as described earlier, the neural networks may have different levels of discrimination, i.e. network 2 708 may be more discriminatory than network 1 706. In FIG. 7, network 1 706 detects a 70% match that the input image 702 belongs to the same person as input image 704. In some embodiments, a 70% match by the neural network 1 may be considered a successful recognition of the user's identity, such as in block 602 of FIG. 6. In some embodiments, as network 2 may be trained to detect near-exact matches of features, and not just recognize an identity of the face, network 2 708 detects a 98% match between input image 702 and image 704. In some embodiments, network 2 708 may be more discriminatory than network 1 706. In some embodiments, network 2 may conclude an input image 702 is fraudulent if the match percentage is above a certain threshold, e.g. 99%. Network 2 detects a 98% match, which is below the threshold for concluding that the input image is fraudulent. Network 2 708 may conclude that input image 702 is not fraudulent, and may grant the user access.

Figure 8:
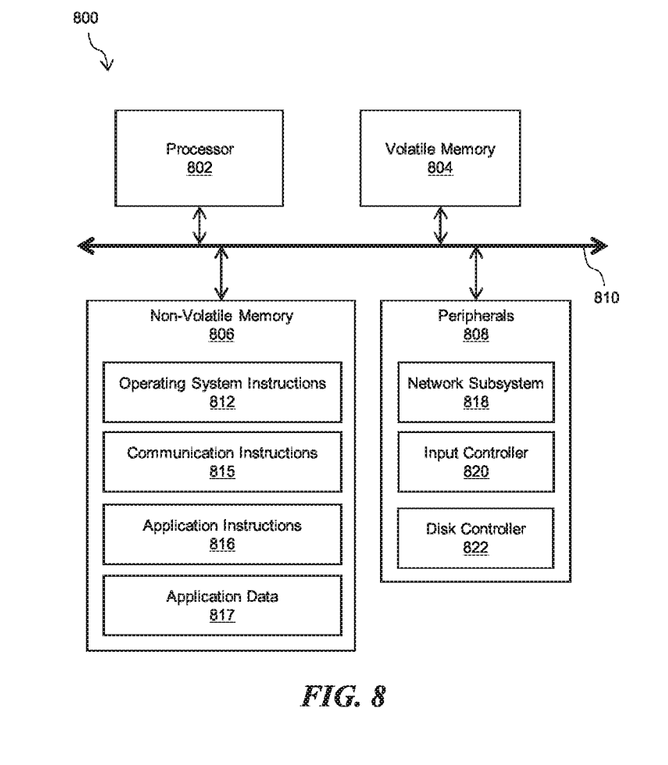
FIG. 8 is a diagram of an illustrative server device that can be used within the system of FIG. 1, according to some embodiments of the present disclosure.

FIG. 8 is a diagram of an illustrative server device 800 that can be used within system 100 of FIG. 1. Server device 800 may implement various features and processes as described herein. Server device 800 may be implemented on any electronic device that runs software applications derived from complied instructions, including without limitation personal computers, servers, smart phones, media players, electronic tablets, game consoles, email devices, etc. In some implementations, server device 800 may include one or more processors 802, volatile memory 804, non-volatile memory 806, and one or more peripherals 808. These components may be interconnected by one or more computer buses 810.

Processor(s) 802 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Bus 810 may be any known internal or external bus technology, including but not limited to ISA, EISA, PCI, PCI Express, NuBus, USB, Serial ATA, or FireWire. Volatile memory 804 may include, for example, SDRAM. Processor 802 may receive instructions and data from a read-only memory or a random access memory or both. The essential elements of a computer may include a processor for executing instructions and one or more memories for storing instructions and data.

Non-volatile memory 806 may include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 806 may store various computer instructions including operating system instructions 812, communication instructions 815, application instructions 816, and application data 817. Operating system instructions 812 may include instructions for implementing an operating system (e.g., Mac OS®, Windows®, or Linux). The operating system may be multi-user, multiprocessing, multitasking, multithreading, real-time, and the like. Communication instructions 815 may include network communications instructions, for example, software for implementing communication protocols, such as TCP/IP, HTTP, Ethernet, telephony, etc. Application instructions 816 can include instructions for detecting fraudulent images in image recognition systems according to the systems and methods disclosed herein. For example, application instructions 816 may include instructions for components 114-120 described above in conjunction with FIG. 1. Application data 817 may include data corresponding to 122*a-c* described above in conjunction with FIG. 1.

Peripherals 808 may be included within server device 800 or operatively coupled to communicate with server device 800. Peripherals 808 may include, for example, network subsystem 818, input controller 820, and disk controller 822. Network subsystem 818 may include, for example, an Ethernet of WiFi adapter. Input controller 820 may be any known input device technology, including but not limited to a keyboard (including a virtual keyboard), mouse, track ball, and touch-sensitive pad or display. Disk controller 622 may include one or more mass storage devices for storing data files; such devices include magnetic disks, such as internal hard disks and removable disks; magneto-optical disks; and optical disks.

Figure 9:
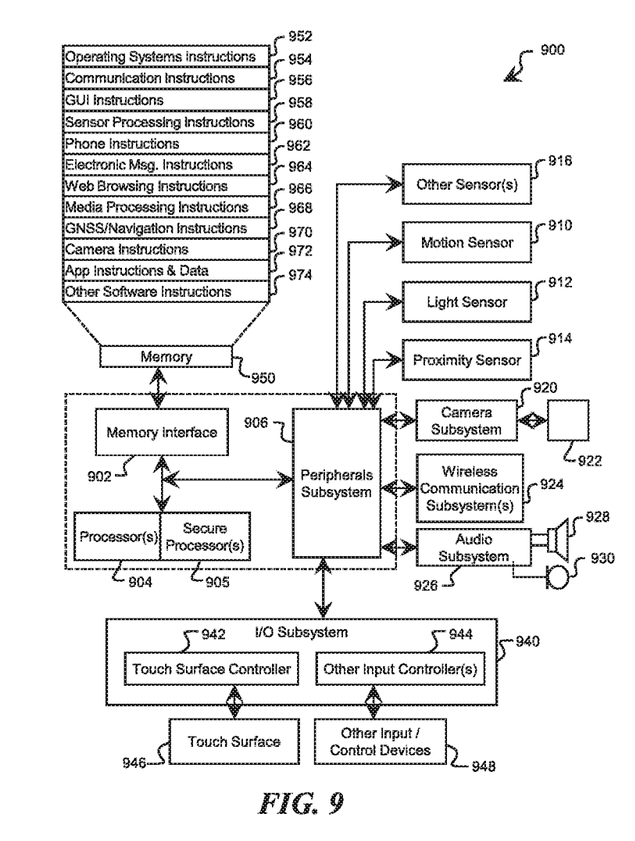
FIG. 9 is a diagram of an illustrative client device that can be used within the system of FIG. 1, according to some embodiments of the present disclosure.

FIG. 9 is an illustrative device 900 for detecting fraud in image recognition systems within system 100 of FIG. 1, according to an embodiment of the present disclosure. In some embodiments, device 900 may be user device 102. The illustrative user device 900 may include a memory interface 902, one or more data processors, image processors, central processing units 904, and/or secure processing units 905, and peripherals subsystem 906. Memory interface 902, one or more processors 904 and/or secure processors 905, and/or peripherals interface 906 may be separate components or may be integrated in one or more integrated circuits. The various components in user device 900 may be coupled by one or more communication buses or signal lines.

Sensors, devices, and subsystems may be coupled to peripherals subsystem 906 to facilitate multiple functionalities. For example, motion sensor 910, light sensor 912, and proximity sensor 914 may be coupled to peripherals subsystem 906 to facilitate orientation, lighting, and proximity functions. Other sensors 916 may also be connected to peripherals subsystem 906, such as a global navigation satellite system (GNSS) (e.g., GPS receiver), a temperature sensor, a biometric sensor, magnetometer, or other sensing device, to facilitate related functionalities.

Camera subsystem 920 and optical sensor 922, e.g., a charged coupled device (CCD) or a complementary metal-oxide semiconductor (CMOS) optical sensor, may be utilized to facilitate camera functions, such as recording photographs and video clips. Camera subsystem 920 and optical sensor 922 may be used to collect images of a user to be used during authentication of a user, e.g., by performing facial recognition analysis.

Communication functions may be facilitated through one or more wired and/or wireless communication subsystems 924, which can include radio frequency receivers and transmitters and/or optical (e.g., infrared) receivers and transmitters. For example, the Bluetooth (e.g., Bluetooth low energy (BTLE)) and/or WiFi communications described herein may be handled by wireless communication subsystems 924. The specific design and implementation of communication subsystems 924 may depend on the communication network(s) over which the user device 900 is intended to operate. For example, user device 900 may include communication subsystems 924 designed to operate over a GSM network, a GPRS network, an EDGE network, a WiFi or WiMax network, and a Bluetooth™ network. For example, wireless communication subsystems 924 may include hosting protocols such that device 900 can be configured as a base station for other wireless devices and/or to provide a WiFi service.

Audio subsystem 926 may be coupled to speaker 928 and microphone 930 to facilitate voice-enabled functions, such as speaker recognition, voice replication, digital recording, and telephony functions. Audio subsystem 926 may be configured to facilitate processing voice commands, voice-printing, and voice authentication, for example.

I/O subsystem 940 may include a touch-surface controller 942 and/or other input controller(s) 944. Touch-surface controller 942 may be coupled to a touch surface 946. Touch-surface 946 and touch-surface controller 942 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 946.

The other input controller(s) 944 may be coupled to other input/control devices 948, such as one or more buttons, rocker switches, thumb-wheel, infrared port, USB port, and/or a pointer device such as a stylus. The one or more buttons (not shown) may include an up/down button for volume control of speaker 928 and/or microphone 930.

In some implementations, a pressing of the button for a first duration may disengage a lock of touch-surface 946; and a pressing of the button for a second duration that is longer than the first duration may turn power to user device 900 on or off. Pressing the button for a third duration may activate a voice control, or voice command, module that enables the user to speak commands into microphone 930 to cause the device to execute the spoken command. The user may customize a functionality of one or more of the buttons. Touch-surface 946 can, for example, also be used to implement virtual or soft buttons and/or a keyboard.

In some implementations, user device 900 may present recorded audio and/or video files, such as MP3, AAC, and MPEG files. In some implementations, user device 900 may include the functionality of an MP3 player, such as an iPod™. User device 900 may, therefore, include a 36-pin connector and/or 8-pin connector that is compatible with the iPod. Other input/output and control devices may also be used.

Memory interface 902 may be coupled to memory 950. Memory 950 may include high-speed random access memory and/or non-volatile memory, such as one or more magnetic disk storage devices, one or more optical storage devices, and/or flash memory (e.g., NAND, NOR). Memory 950 may store an operating system 952, such as Darwin, RTXC, LINUX, UNIX, OS X, Windows, or an embedded operating system such as VxWorks.

Operating system 952 may include instructions for handling basic system services and for performing hardware dependent tasks. In some implementations, operating system 952 may be a kernel (e.g., UNIX kernel). In some implementations, operating system 952 may include instructions for performing voice authentication.

Memory 950 may also store communication instructions 954 to facilitate communicating with one or more additional devices, one or more computers and/or one or more servers. Memory 950 may include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic messaging-related process and functions; web browsing instructions 964 to facilitate web browsing-related processes and functions; media processing instructions 966 to facilitate media processing-related functions and processes; GNSS/Navigation instructions 968 to facilitate GNSS and navigation-related processes and instructions; and/or camera instructions 970 to facilitate camera-related processes and functions.

Memory 950 may store application (or "app") instructions and data 972, such as instructions for the apps described above in the context of FIGS. 1-7. Memory 950 may also store other software instructions 974 for various other software applications in place on device 900.

Each of the above identified instructions and applications may correspond to a set of instructions for performing one or more functions described herein. These instructions need not be implemented as separate software programs, procedures, or modules. Memory 950 may include additional instructions or fewer instructions. Furthermore, various functions of user device 900 may be implemented in hardware and/or in software, including in one or more signal processing and/or application specific integrated circuits.

In some embodiments, processor(s) 904 may perform processing including executing instructions stored in memory 950, and secure processor 905 may perform some processing in a secure environment that may be inaccessible to other components of user device 900. For example, secure processor 905 may include cryptographic algorithms on board, hardware encryption, and physical tamper proofing. Secure processor 905 may be manufactured in secure facilities. Secure processor 905 may encrypt data/challenges from external devices. Secure processor 905 may encrypt entire data packages that may be sent from user device 900 to the network. Secure processor 905 may separate a valid user/external device from a spoofed one, since a hacked or spoofed device may not have the private keys necessary to encrypt/decrypt, hash, or digitally sign data, as described herein.

Methods described herein may represent processing that occurs within a system for detecting fraud in image recognition systems (e.g., system 100 of FIG. 1). The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing illustrative embodiments, it is understood that the present disclosure has been made only by way of example, and that numerous changes in the details of implementation of the disclosed subject matter may be made without departing from the spirit and scope of the disclosed subject matter.

The invention claimed is:

1. A method for detecting fraud in image recognition systems comprising:
receiving one or more input images from a device associated with a user, the one or more input images comprising a face associated with the user;
identifying the face in the one or more input images with a computer vision technique;
analyzing the one or more input images using a first neural network trained to recognize the user's face;
analyzing the one or more input images using a second neural network trained to detect fraudulent images by comparing the one or more input images to a set of deformed images of the user, wherein an input image of the one or more input images is detected to be a fraudulent image if it matches a deformed image;
determining, based on the second analyzing step, whether the image is fraudulent or non-fraudulent;
granting access to the user if the first neural network recognizes the user's face and, as a result of the determining step, the image is non-fraudulent; and
preventing access to the user if the first neural network cannot recognize the user's face or, as a result of the determining step, the image is fraudulent.

2. The method of claim 1, wherein the second neural network is trained to determine if the one or more input images match an image from a set of deformed images, the set of deformed images comprising a set of deformed images generated by applying a set of deformations to known images of the user.

3. The method of claim 2, wherein the set of deformed images comprises images generated by applying the set of deformations to images obtained from the user's social media profiles.

4. The method of claim 3 comprising:
periodically updating the set of deformed images by obtaining new images from the user's social media profiles; and
applying the set of deformations to the new images obtained from the user's social media profiles.

5. The method of claim 2, wherein the set of deformed images comprises images generated by applying the set of deformations to images stored on the device associated with the user.

6. The method of claim 1, wherein the second neural network is hyper-trained to require a closer match than the first neural network.

7. The method of claim 1, wherein the one or more received input images are photos taken by the device associated with the user.

8. The method of claim 1, wherein the receiving comprises receiving exactly one input image.

9. A method for detecting fraud in image recognition systems comprising:
obtaining, by a device associated with a user, one or more input images associated with the user, the one or more input images comprising a face associated with the user;
using a model comprising two neural networks to analyze the one or more input images as an authentication check to verify the identity of the user, wherein the model is configured to:
identify a face of the user in the one or more input images with a computer vision technique;
analyze the one or more input images using a first neural network trained to recognize the user's face;
analyze the one or more input images using a second neural network trained to detect fraudulent images by comparing the one or more input images to a set of deformed images of the user, wherein an input image of the one or more input images is detected to be a fraudulent image if it matches a deformed image; and
determine, based on the second analyzing step, whether the image is fraudulent or non-fraudulent;
granting access to the user if the model recognizes the user's face and, as a result of the determining step, the image is non-fraudulent; and
preventing access to the user if the model cannot recognize the user's face or, as a result of the determining step, the image is fraudulent.

10. The method of claim 9, wherein the second neural network is trained to determine if the one or more input images match an image from a set of deformed images, the set of deformed images comprising a set of deformed images generated by applying a set of deformations known images of the user.

11. The method of claim 10, wherein the set of deformed images comprises images generated by applying the set of deformations to images obtained from the user's social media profiles.

12. The method of claim 11 comprising periodically updating the set of deformed images by obtaining new images from the user's social media profiles and applying the set of deformations to the new images obtained from the user's social media profiles.

13. The method of claim 9, wherein the device is a mobile device.

14. The method of claim 9, wherein the device is a computer.

15. The method of claim 1, wherein the second neural network is hyper-trained to require a closer match than the first neural network.

16. The method of claim 10, wherein the set of deformed images comprises images generated by applying the set of deformations to images stored on the device associated with the user.

17. The method of claim 9, wherein obtaining the one or more input images comprises taking, by the device associated with a user, photos.

18. The method of claim 9, wherein the obtaining comprises obtaining exactly one input image.

19. The method of claim 9, wherein the model is downloaded from a server.

20. A computer-readable medium comprising instructions stored thereon which, when executed by a machine, cause the machine to execute a process operable to:
- receive one or more input images from a device associated with a user, the one or more input images comprising a face associated with the user, wherein the device is configured to:
  - obtain one or more input images associated with a user comprising a face associated with the user; and
  - send one or more input images to a server;
- wherein the server is configured to:
  - identify the face in the one or more input images with a computer vision technique;
  - analyze the one or more input images using a first neural network trained to recognize the user's face;
  - analyze the one or more input images using a second neural network trained to detect fraudulent images by comparing the one or more input images to a set of deformed images of the user, wherein an input image of the one or more input images is detected to be a fraudulent image if it matches a deformed image;
  - determine, based on the second analyzing step, whether the image is fraudulent or non-fraudulent;
  - grant access to the user if the first neural network recognizes the user's face and, as a result of the determining step, the image is non-fraudulent; and
  - prevent access to the user if the first neural network cannot recognize the user's face or, as a result of the determining step, the image is fraudulent.

\* \* \* \* \*